(No Model.)
J. M. JACKSON.
PLANTER.
No. 443,596. Patented Dec. 30, 1890.
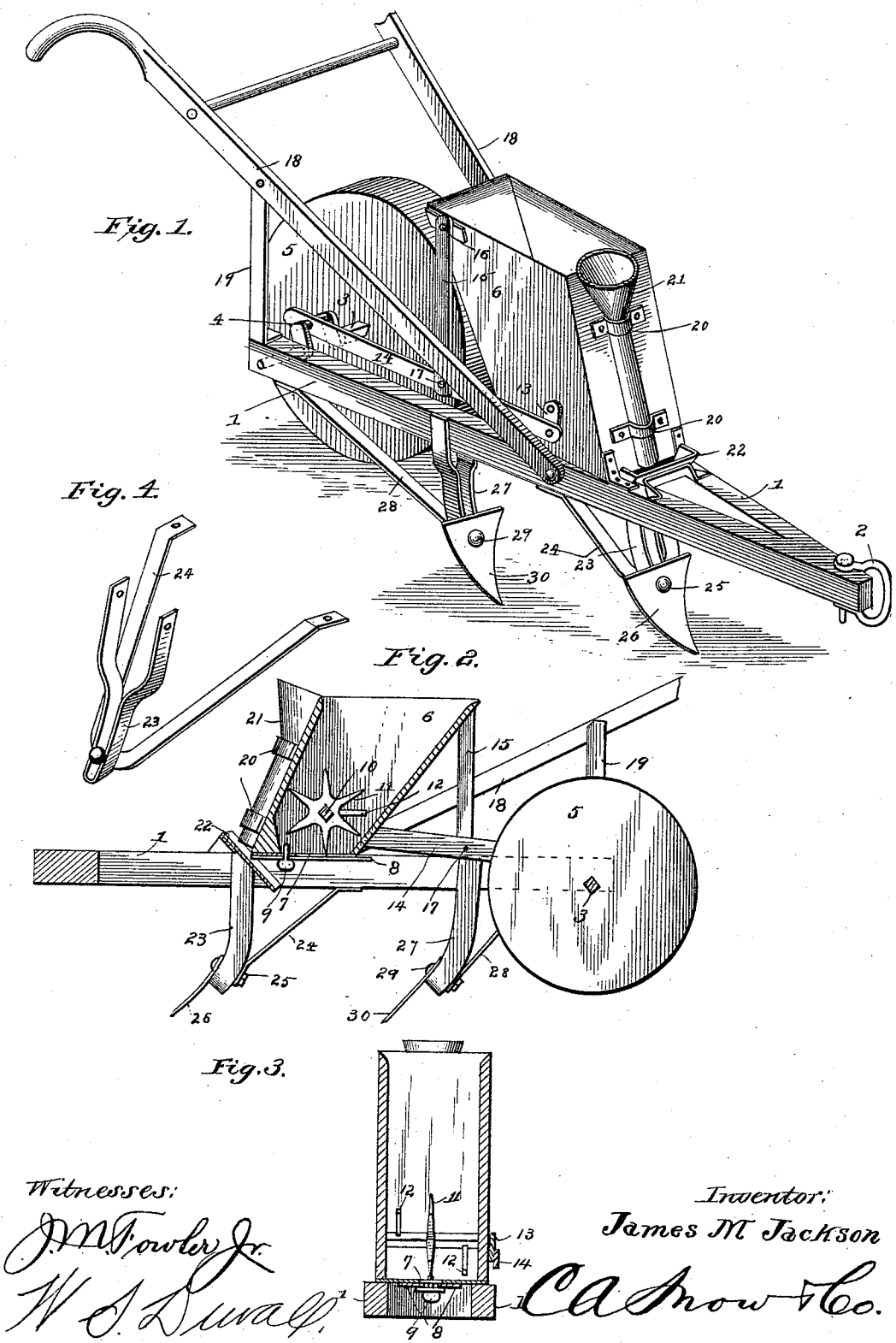
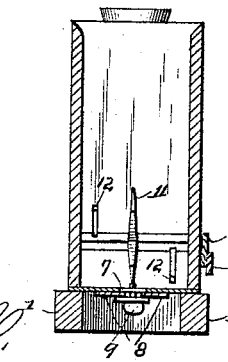
Witnesses:
J. N. Fowler Jr.
W. S. Duvall
Inventor:
James M. Jackson
C. A. Snow & Co.

UNITED STATES PATENT OFFICE.

JAMES M. JACKSON, OF FIVE POINTS, ALABAMA.

PLANTER.

SPECIFICATION forming part of Letters Patent No. 443,596, dated December 30, 1890.

Application filed July 15, 1890. Serial No. 358,787. (No model.)

*To all whom it may concern:*

Be it known that I, JAMES M. JACKSON, a citizen of the United States, residing at Five Points, in the county of Chambers and State of Alabama, have invented a new and useful Planter, of which the following is a specification.

This invention has relation to cotton-planters; and the objects of the invention are to provide an extremely simple, strong, and durable planter at a minimum cost, said planter being so constructed as to thoroughly protect all of its operating mechanisms and adapt it to open the furrow, plant the seed, cover and pack the same, and, furthermore, if desired, to plant with said seed a proper quantity of fertilizing agent.

With the above objects in view the invention consists in certain features of construction hereinafter specified, and particularly pointed out in the claim.

Referring to the drawings, Figure 1 is a perspective of a cotton-planter constructed in accordance with my invention. Fig. 2 is a longitudinal vertical section of the same. Fig. 3 is a transverse section through the hopper. Fig. 4 is a detail in perspective of the front shovel-standard and its brace.

Like numerals of reference indicate like parts in all the figures of the drawings.

1 designates a pair of converging side bars, to the front ends of which is secured the usual clevis 2. The rear ends of the side bars have journaled therein a crank-shaft 3, which at its center, and therefore at one side of its crank 4, is provided with a drive-wheel 5, designed also to act as a packing-wheel, for which purpose said wheel is provided with a broad periphery or tread, as shown.

6 designates the hopper, mounted upon the side bars 1 some distance in advance of the wheel 5, said hopper having its rear wall forwardly inclined, as shown, so that the operator following the planter may obtain a sight between the rear wall of the hopper and the wheel. The bottom of the hopper is provided with a seed-slot 7, under which is located a seed-slide 8, slotted and made adjustable by means of a set-screw 9, passing through the plate and into the bottom of the hopper. Journaled in the side walls of the hopper is a shaft 10, which within said hopper is provided with a feed-wheel 11, said wheel having a series of radiating arms, as shown, and at each side of the wheel and at diametrically opposite sides of the shaft 10 are located stirring-arms 12. Outside of the hopper 6 the shaft 10 is provided with a shaft-operating crank-arm 13, which crank is connected with the crank 4 of the shaft 3 by means of a connecting-rod 14.

15 designates a swinging arm pivoted, as at 16, to the upper rear end of the hopper, and the lower end of the rod is pivoted, as at 17, to the central portion of the connecting-rod 14.

18 designates a pair of handles bolted at their lower ends to the outer sides of the side bars 1, said handles extending to the rear some distance beyond the packing-wheel 3, and being braced by a pair of vertical braces 19, interposed between the rear end of the side bars 1 and said handles.

The front wall of the hopper 6 is provided with a pair of keepers 20, in which is mounted in a removable manner a funnel or horn shaped hopper 21, adapted to receive a fertilizing agent and to deliver the same upon an inclined and inwardly-disposed delivery-board 22, the rear lower extremity of which is slightly in advance of the seed-slide opening.

In advance of the delivery-board above mentioned there is bolted to the inner sides of the side bars 1 a depending bifurcated shovel-standard 23, the bifurcations being converged toward the lower end of the standard. The standard is braced against longitudinal movement by means of a U-shaped inclined brace 24, the upper ends of which are bolted to the under sides of the side bars 1, and the lower end of said brace is bolted, as at 25, between the bifurcations of said standard 23. To the standard by means of the bolt 25 is connected the shovel or plow 26, which shovel or plow is located under the center of the planter in line with the seed-opening and the packing-wheel and acts to open the furrow for the reception of the seed and fertilizer.

27 designates a pair of bifurcated depending shovel-standards, one of which is secured to each of the side bars 1, and are braced against longitudinal movement by means of inclined braces 28, bolted to the lower ends of the standards 27 by binding-bolts 29, which also serve as a means for securing to the standards the covering shovels or plows 30.

It will be observed that various forms of shovels or plows may be employed and substituted one for the other, it being simply necessary to loosen the nuts 29 and 25 for such purpose.

By reason of the hopper having the inclined wall and being located in advance of the wheel a sufficient distance, the operator may see at all times whether or not the seed is freely flowing or if stopped by clogging, as will sometimes occur. The inclination of the rear wall of the hopper is such that if said wall was continued below the hopper it would meet the path traversed by the seed in dropping at the bottom of the furrow.

The operation of the invention is as follows: The ground or drive wheel 5 operates the crank-shaft 3, the crank 4, the connecting-rod 14, and the crank 13, the shaft of which rotates the feeding and stirring devices. Thus a discharge of seed takes place directly in rear of the front shovel 26, which opens the furrow, and at each side of the furrow and in rear of the hopper are located the before-mentioned covering-shovels 30. These covering-shovels are located in rear of the hopper 6 and slightly in advance of the packing-wheel 5, which latter after the furrow has been covered by the shovels 30, gently packs the soil upon the freshly-planted seed and thus aids in an early sprouting of the same.

Having described my invention, what I claim is—

In a planter, the combination, with the opposite side bars and the hopper mounted thereon provided with a seed-slide, of a funnel supported at the front end of the hopper and an inclined delivery-board supported under the lower end of the spout and the said hopper, substantially as specified.

In testimony that I claim the foregoing as my own I have hereto affixed my signature in presence of two witnesses.

JAMES M. JACKSON.

Witnesses:
S. M. GILDER,
W. N. BRAGAW.